US007656383B2

(12) United States Patent
Hedrick (10) Patent No.: US 7,656,383 B2
(45) Date of Patent: Feb. 2, 2010

(54) METHOD AND APPARATUS FOR ILLUMINATING A FLAT PANEL DISPLAY WITH A VARIABLY-ADJUSTABLE BACKLIGHT

(75) Inventor: Geoffrey S. M. Hedrick, Malvern, PA (US)

(73) Assignee: Innovative Solutions & Support, Inc., Exton, PA (US)

( * ) Notice: Subject to any disclaimer, the term of this patent is extended or adjusted under 35 U.S.C. 154(b) by 1009 days.

(21) Appl. No.: 10/613,937

(22) Filed: Jul. 3, 2003

(65) Prior Publication Data

US 2004/0051691 A1    Mar. 18, 2004

Related U.S. Application Data

(60) Provisional application No. 60/393,502, filed on Jul. 3, 2002.

(51) Int. Cl.
*G09G 3/36* (2006.01)
(52) U.S. Cl. ............ 345/102; 345/77; 349/50; 349/68; 349/70
(58) Field of Classification Search ........ 345/102, 345/77; 349/77, 50, 68, 70
See application file for complete search history.

(56) References Cited

U.S. PATENT DOCUMENTS

| | | | |
|---|---|---|---|
| 4,760,389 A | | 7/1988 | Aoki et al. |
| 5,143,433 A | * | 9/1992 | Farrell .................... 362/29 |
| 5,760,760 A | * | 6/1998 | Helms ..................... 345/102 |
| 5,886,681 A | * | 3/1999 | Walsh et al. ............. 345/102 |
| 6,028,597 A | | 2/2000 | Ryan et al. |
| 6,271,813 B1 | * | 8/2001 | Palalau ...................... 345/77 |
| 6,447,132 B1 | * | 9/2002 | Harter, Jr. ................. 362/29 |
| 7,242,384 B2 | * | 7/2007 | Yamamoto et al. ....... 345/102 |
| 2001/0008395 A1 | | 7/2001 | Yamamoto et al. | |

FOREIGN PATENT DOCUMENTS

EP    0 364 346    4/1990
WO    WO 02/37454    5/2002

* cited by examiner

*Primary Examiner*—Amr Awad
*Assistant Examiner*—Michael Pervan
(74) *Attorney, Agent, or Firm*—Cohen Pontani Lieberman & Pavane LLP (57) ABSTRACT

A backlit flat panel display includes a fluorescent tube positioned for illuminating the display, and a plurality of display illuminating LEDs on the periphery of the display. The fluorescent tube illuminates the display through a first range of brightness above a predetermined transition level and the LEDs illuminate the display through a second range of brightness below the transition level. When the illumination of the display is adjusted through the transition level to account for changes in ambient light, the LEDs and the fluorescent tube are operated together, so that the combined brightness of the illumination provided by the LEDs and the fluorescent tube will provide the desired display brightness; this advantageously compensates for delayed illumination of the fluorescent tube at start up and for persistence in the tube after shutdown.

12 Claims, 3 Drawing Sheets

METHOD AND APPARATUS FOR ILLUMINATING A FLAT PANEL DISPLAY WITH A VARIABLY-ADJUSTABLE BACKLIGHT

RELATED APPLICATION

This application claims priority from U.S. Provisional Patent Application Ser. No. 60/393,502, filed: Jul. 3, 2002.

BACKGROUND OF THE INVENTION

1. Field of the Invention

The present invention relates generally to methods and apparatus for illuminating flat panel displays. More particularly, the invention relates to methods and apparatus for providing substantially continuously-variable levels of illumination of such displays from very low levels to very high levels of display illumination.

2. Description of the Related Art

Flat panel displays (FPDs), such for example as those based on liquid crystal technologies, are typically illuminated using an electrically-activated source of light that is located at or proximate the back or rear side or face or peripheral edges of the display. In a common implementation of such FPD backlighting, an S-shaped or otherwise generally serpentine fluorescent tube is positioned behind the display to provide a substantially uniform illumination of the FPD screen when an electric current is applied to the fluorescent tube. It is also known to utilize a plurality of concurrently-activated fluorescent tubes to backlight a FPD, and although the present invention is for convenience described herein using a single-tube implementation, it should be understood that the invention is equally applicable to a multiple tube arrangement and, indeed, will typically be practiced using multiple tubes.

The increasing use of FPDs in aircraft—and most particularly in the cockpits or flight decks of modern commercial airliners to display to the pilot and flight crew a wide range of aircraft, flight, navigation and other data used in the operation and control of the aircraft—requires that the FPDs be illuminated in a manner that insures that pilots can quickly and easily view and locate the relevant information displayed thereon under a variety of ambient lighting conditions. In normal daylight conditions, for example, it may be necessary or appropriate to illuminate an FPD to a typical brightness level of somewhere between about 100 and 150 Foot-Lamberts (ft-L). Under night conditions, on the other hand, that same amount of illumination renders the FPD screen far too bright for use and could interfere with a pilot's ability to readily view and perceive other, less luminous objects both within the cockpit and outside of the aircraft; rather, at night a backlit FPD illumination of as little as one-thousandth (1/1000) to one-ten-thousandth (1/10,000) of the normal daytime illumination will normally suffice.

In operation, a fluorescent tube emits light when an electric current flowing through the tube ionizes a vapor confined within the tube to create a plasma or ion cloud which, in turn, causes a phosphor coating on the interior surface of the tube to fluoresce and thereby emit visible light. Thus, when an electrical potential is applied across the terminals of a fluorescent tube, the resulting current flow between the tube electrodes creates a plasma within the tube and the tube emits visible light. When application of the electrical potential across the terminals is discontinued or interrupted, the plasma dissipates and the tube ceases to emit light. Reapplication of the electrical potential across the tube terminals causes the plasma to reignite or regenerate and the tube to once again emit visible light.

The magnitude of the illumination emitted by a fluorescent tube can be varied through selective control of the amount of electrical current that operatively flows through the tube. It is accordingly possible to reduce or dim the FPD image brightness from that desirably utilized in normal "daylight" conditions by selectively reducing the electric current supply to the tube from that used to produce the daylight illumination level. The tube illumination level can be reduced in this manner—i.e. through straightforward controlled reduction of the electric current flowing through the tube—to dim the tube by a factor of about 100 without loss or dissipation of the plasma, but with continued reduction beyond that point the electric current is typically insufficient to maintain the plasma. In order to further reduce the emitted illumination to extremely low levels of brightness (e.g. to levels below about 1 ft-L), therefore, it is necessary to pulse width modulate the applied power and suitably adjust the duty cycle to obtain the desired further reduced illumination brightness levels.

The use of pulse width modulation to drive the fluorescent tube means that, in effect, the tube is being repeatedly switched "on" and "off" at a predetermined rate defined by the duty cycle. As the current flow ceases in the "off" period of each cycle, the plasma dissipates and must then be regenerated or reignited in the following "on" period of that (or of the next) cycle. Each time that the tube is switched or pulsed back "on", a large rapid surge of current flows through the tube and there is a high energy burst as the plasma is regenerated, resulting in rapid wear on the tube cathode. Over time, these rapid and repeated restarts of a fluorescent tube have been found to reduce the effective life of the tube by as much as a factor of 10.

SUMMARY OF THE INVENTION

The present invention provides a method and apparatus for providing, in a backlit FPD utilizing a fluorescent tube for image illumination, the ability to smoothly reduce the FPD illumination levels by a factor of 1,000 or 10,000 or more without unnecessarily reducing the lifetime of the fluorescent tube due to repeated rapid restarts of the tube. The invention thereby advantageously facilitates the use of backlit FPDs in critical environments such as aircraft cockpits and flight decks to present readily viewable aircraft, flight, navigation and other data to pilots and flight crews under a wide variety of ambient lighting conditions since the FPD brightness can be selectively or otherwise suitably varied over an unusually broad range of as much as about ten-thousand-to-one (10,000:1).

In accordance with the invention, a backlit FPD that includes or has associated with it a conventional serpentine or otherwise formed fluorescent tube positioned for illuminating displayed images on the FPD, is additionally provided with a plurality of light emitting diodes (LEDs) disposed at or proximate the back or rear face or peripheral edges of the FPD screen. The LEDs, which in one contemplated embodiment of the invention operatively emit a substantially white (i.e. uncolored) visible light, may be located along the display screen periphery or directly behind the screen or at any other position or location or arrangement suitable for uniformly illuminating the screen without creating unintended illumination "hot spots" when the LEDs are energized. The LEDs are connected to a control circuit that operatively energizes the LEDs with an electric current which the control circuit selectively varies so that the LEDs emit, at any given time, a predetermined amount or level of illumination based on the current flow. The control circuit includes a photosensor for dynamically monitoring the brightness or intensity level of the FPD backlighting that is being applied to the display panel—whether, as explained hereinbelow, from the LEDs or from the fluorescent tube.

Currently-available LEDs can emit light at a maximum brightness of about 5 ft-L, and by reducing the current flow to such LEDs they can be operated to emit light at extremely low levels of less than one-hundredth ft-L (1/100 ft-L). Thus, although currently-available LEDs cannot emit sufficient light to illuminate a FPD as desired in normal daylight conditions—at which a brightness of 100 to 150 ft-L is preferred—they can through suitable control of the electrical operating current be employed to provide an adequate FPD backlight under night conditions, at which a brightness of as low as about 1/100 ft-L or less may be desired or otherwise deemed appropriate.

These and other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters identify similar elements throughout the several views.

DETAILED DESCRIPTION OF THE CURRENTLY PREFERRED EMBODIMENTS

Figure 1:
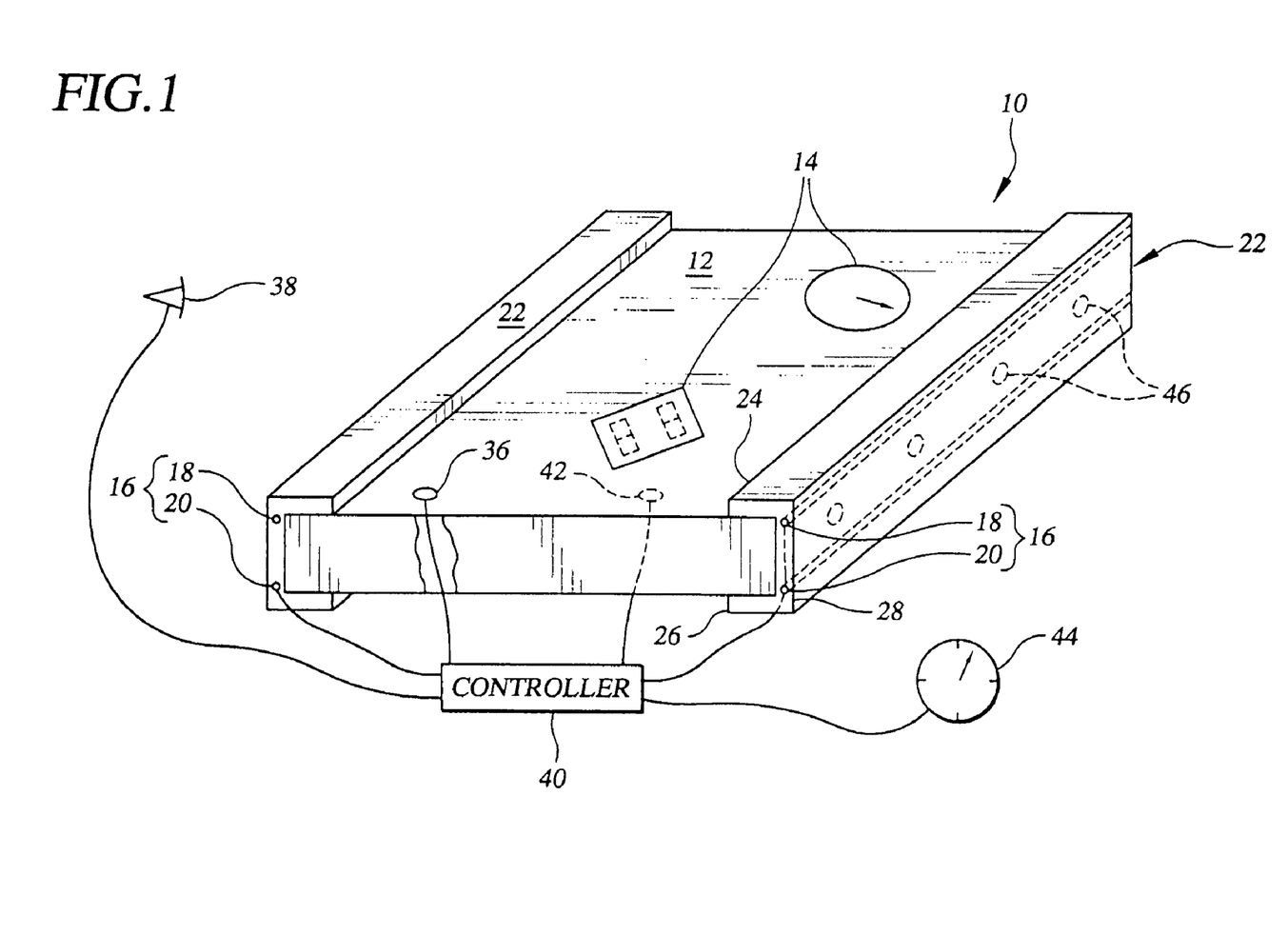
FIG. 1 is an elevated perspective view of a flat panel display (FPD) in accordance with the invention, shown partly in breakaway and partly in schematic.

Referring now to the drawings, by way of illustration and without intending to unnecessarily or unduly limit the invention, FIG. 1 depicts a generally conventional flat panel display (FPD) 10 that additionally includes elements provided in accordance with the invention. FPD 10 has an upper or outer viewable display surface 12 on which indicia 14 imaged by the display may be seen. Indicia 14 may be of any desired type, as for example virtual dials, digital displays or any other form of displayed information. The invention can nevertheless be applied to or used with almost any type or construction of FPD that is illuminated by a backlight or other associated source of lighting.

As is known, FPD 10 is commonly illuminated by a fluorescent light source 16. In the illustrated embodiment, of FIG. 1 fluorescent light source 16 comprises a pair of fluorescent tube light bulbs 18, 20 secured to each of the opposed peripheral sides of FPD 10 by a side mounted securing means 22. Securing means 22 may be of any appropriate combination or desired type and may include, without limitation, snaps, pressure fittings, tongue-and-groove locking fixtures, etc. One of ordinary skill can select any appropriate means of affixing or otherwise locating securing means 22 along the side edges of FPD 10. In the illustrated embodiment, securing means 22 is formed as a friction fit or adhesively-secured member.

Figure 2:
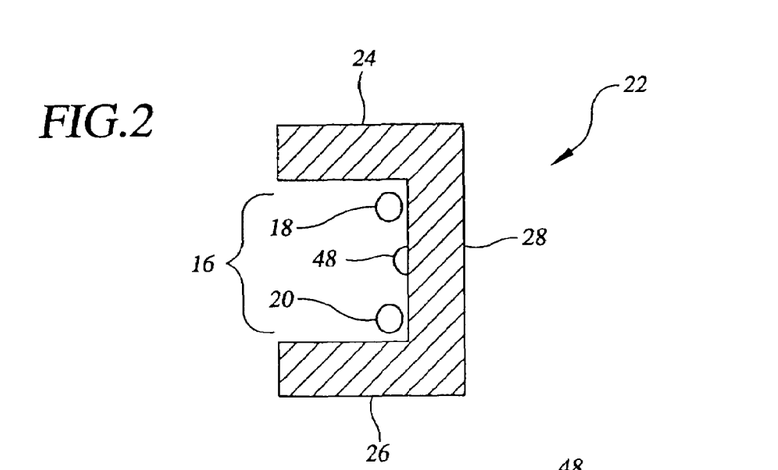
FIG. 2 is a cross-sectional view of an edge-mounted lamp channel bracket used in a preferred embodiment of the invention.

As seen best in FIG. 2, member 22 is a generally U-shaped channel-defining bracket formed of an upper leg 24 and a lower leg 26 connected by a crossbar 28. A first elongated fluorescent bulb 18 is positioned at the corner formed by upper leg 24 and crossbar 28, and a second elongated fluorescent bulb 20 is positioned at the corner formed by lower leg 26 and crossbar 28.

In conventional fashion, fluorescent bulbs 18, 20 of each bracket 22 operatively generate light in response to an input voltage, and thereby illuminate display 10. As will be appreciated by those of ordinary skill in the art, fluorescent light source 16 may alternatively be implemented using only a single fluorescent light source, in a single retaining bracket 22 disposed along only one edge of the display. Alternatively, fluorescent light source 16 may comprise a conventional serpentine fluorescent light bulb 34 disposed along or adjacent or proximate the bottom face of FPD 10 (see FIG. 3).

Returning to FIG. 1, FPD 10 preferably includes at least one photosensor 36. Photosensor 36 may by way of illustrative example be disposed on a corner of upper display surface 12, to sense the level of ambient light impinging on FPD 10. A second photosensor 38 may be disposed at a location removed from FPD 10 to measure the ambient light at a different location. Photosensor 36 and/or 38 may also be mounted on a bezel of the display or at an adjacent location on the cockpit instrument panel or the like.

Each photosensor 36, 38 is connected to a controller 40 which is also connected to the fluorescent light sources 16. In a preferred embodiment, controller 40 will receive a signal representative of the level of ambient light impinging on each operative photosensor and generate a signal for controlling the fluorescent light sources 16 to illuminate FPD 10, or a respective portion of FPD 10 (depending upon the size of FPD 10). In this context, it is contemplated that a particularly large FPD 10 may require multiple sources of different levels of illumination, such as where only a portion of FPD 10 is in shadow, while another portion thereof is in bright sunlight. For large displays, multiple photosensors may therefore be positioned at different locations on or about FPD 10 so that each section thereof may be appropriately illuminated. If preferred, an average or weighted average of the impinging illumination may be used. All these options will be understood by those of ordinary skill in the art and form no portion of the invention, except as expressly provided in the claims.

FPD 10 also includes one or more feedback photosensors 42 which measure the amount of light being produced by FPD 10 and inputs that information to controller 40. The photo sensor(s) 42 may for example be disposed closely adjacent the near face of the display, and/or proximate the peripheral edges of the display.

It is also contemplated that, in certain applications, it may be desirable to additionally provide a user the ability to manually offset or adjust the level of illumination of FPD 10, such as via a manually-manipulated control 44. Manual control 44 may be of any conventional type, such as a dial or thumbwheel, and may or may not include indicia, as a matter of design choice. Manual control 44 is coupled to controller 40 so that the user may selectively adjust the level of illumination otherwise automatically provided to FPD 10.

Figure 4:
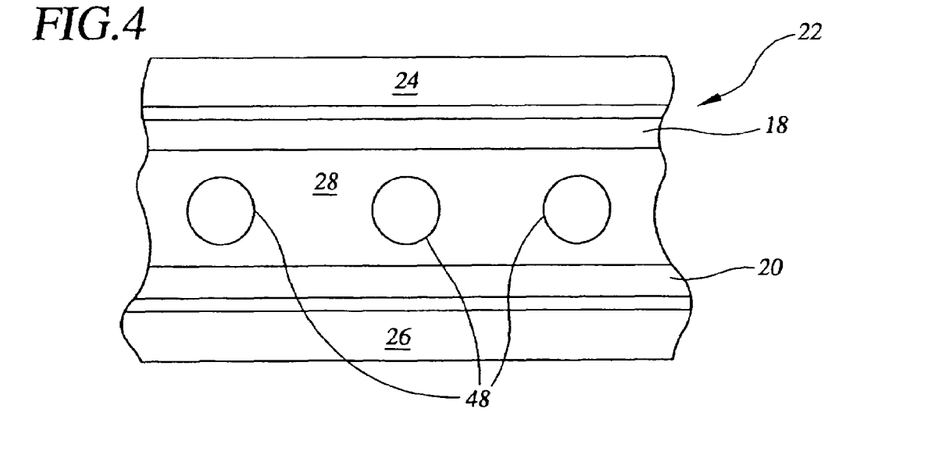
FIG. 4 is a side view of a channel-defining bracket of the FPD of FIGS. 1 and 2.

In accordance with the invention FPD 10 also includes a second non-fluorescent source of light, such as an LED light source, preferably comprising a plurality of spaced apart LEDs 46 disposed on or within brackets 22 as perhaps best shown in FIG. 4. LEDs 46 may by way of example be spaced approximately 2-3 inches (0.8-1.2 cm) apart along the length of bracket 22 and emit white light. Depending upon the particular application, the spacing of LEDs 46 may be varied, and they need not be uniformly aligned. LEDs 46 may also be selected to emit light of different colors, again depending upon the application and operating environment. Implementations in which LEDs of various different colors are present in the same bracket 22, which may be separately illustrated under different conditions, are also within the intended scope and contemplation of the invention. All of these variations may be made by those of ordinary skill in the art without undue experimentation based at least in part on the particular features or construction of FPD 10 and the environment in which it is to operate, such as the anticipated nature and amount of ambient light and the color of displaced indicia 14.

Figure 3:
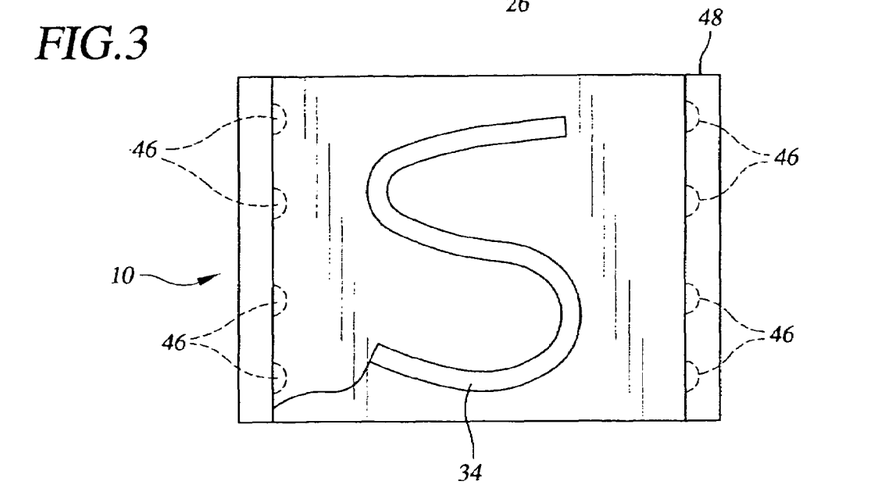
FIG. 3 is a bottom plan view of an alternate embodiment of the invention, utilizing a rear-mounted serpentine fluorescent illumination tube to backlight the FPD.

In another embodiment of the invention in which the fluorescent light source 16 is not located in bracket(s) 22, such as for example the embodiment shown in FIG. 3, LEDs 46 may nevertheless be disposed in a similar or otherwise configured member 46 which is affixed to one or each of the sides of FPD 10 by any conventional means, as described above with respect to bracket(s) 22.

Figure 5:
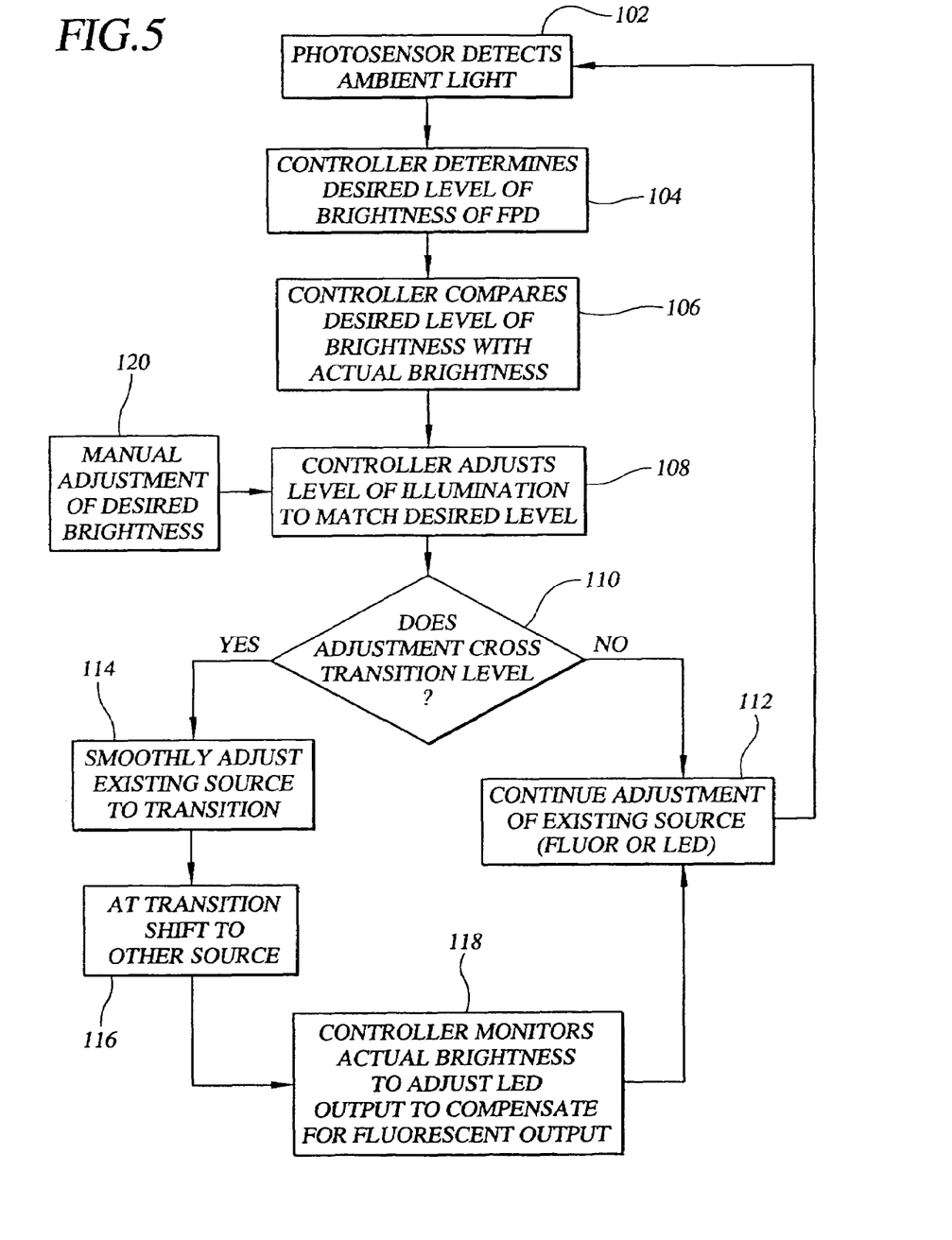
FIG. 5 is a flow chart showing the operation of the inventive FPD in accordance with the inventive method.

The preferred operation of FPD 10 may be best understood with reference to the flow chart of FIG. 5.

The present invention provides a backlit FPD 10 that is illuminated, as a function of ambient environmental conditions, by a combination of a fluorescent light source 16 and a plurality of LEDs 46, and wherein the illumination of FPD 10 can be smoothly and gradually varied between a desired maximum daylight illumination level and a desired minimum night or darkness illumination level. Fluorescent light source 16 illuminates FPD 10 when the desired level of brightness of FPD 10 is within a first brightness range ($R_{fluor}$) extending from the desired maximum daylight illumination level (referred to herein as $L_{maximum}$) to a reduced level ($L_{transition}$) less than the maximum brightness obtainable with LEDs 46 but still greater than the minimum illumination level at which fluorescent light source 16 can be operated by a continuous (i.e. one-hundred percent duty cycle) current without dissipation or loss of the tube plasma (step 106) i.e. while maintaining a continuous, constant-brightness illumination output. LEDs 46, on the other hand, are operated to illuminate FPD 10 within a second brightness range ($R_{LEDs}$) extending from the reduced level $L_{transition}$ to the desired minimum night illumination level ($L_{minimum}$).

Controller 40 controls the outputs of fluorescent light source 16 and LEDs 46 to provide a continuous and smooth variable illumination of FPD 10 within the entire range of operation of FPD 10 from $L_{maximum}$ to $L_{minimum}$ through $L_{transition}$ and back again without any difference perceptible to the observer.

It is generally contemplated that the intended variations in the output illumination level of the fluorescent tube(s) will most commonly be provided by varying the electrical current supplied to the tube(s). Similarly, intended variations in the output illumination level of the LEDs can be provided by suitably varying either the electrical current or the electrical voltage supplied to the LEDs. Nevertheless, it is within the scope and contemplation of the invention that variations in either the current or the voltage supplied to the fluorescent tube(s) and/or LEDs, or in any other electrical signal variable for selectively varying the illumination output of the respective device, can be employed. Accordingly, as used herein the expression "electrical control signal" is intended to denote an electric current or voltage or the like used to selectively vary the illumination output of one or more of these devices.

To achieve this advantageous functionality, photosensor 36 (and/or photosensor 38) continuously detects the level or amount of ambient light impinging on upper display surface 12 (step 102). Based on this detected level of light impinging on FPD 10, controller 40 determines the desired level of illumination or brightness of FPD 10 (step 104). Feedback photosensor 42 provides controller 40 with the detected current level of brightness of FPD 10, and controller 40 compares the determined desired level of brightness with the actual detected level of brightness (step 106).

Based upon this comparison, controller 40 adjusts the level of the actual brightness of FPD 10. If the actual brightness and the desired brightness are both within the range $R_{fluor}$, controller 40 can simply adjust the amount of current flowing to fluorescent light source 16 at a predetermined rate, so that the change is made within the parameters desired for the application. Similarly, if the actual brightness and the desired brightness are both within the range $R_{LEDs}$, controller 40 can simply adjust the amount of voltage or current applied to LEDs 46, so that their output provides the desired level of brightness of FPD 10 (step 108). Controller 40 must additionally determine if the change in desired brightness will reach or cross $L_{transition}$ (step 110). If it does not ("no" result), then the adjustment continues within either $R_{fluor}$ or $R_{LEDs}$ (step 112).

When the difference between the actual brightness and the desired brightness is such that the adjustment will cross $L_{transition}$ (step 110—"yes" result"), controller 40 will first adjust the level of the output of either fluorescent light source 16 (if the illumination level is to be decreased) or LEDs 46 (if the illumination level is to be incurred) until $L_{transition}$ is reached (step 114). Once the actual brightness of FPD 10 reaches $L_{transition}$, controller 40 switches between the two sources of illumination (step 116).

One of the important aspects of the inventive system and method is the manner of operation at and about the illumination level $L_{transition}$ as the illumination level is varied between the upper/brighter range $R_{fluor}$ and the lower/dimmer range $R_{LEDs}$. It is this aspect of the invention that permits the FPD illumination level to be smoothly and continuously varied through the entire range of backlighting, and most particularly at and about the transition level $L_{transition}$ at which the illumination source is switched from one to the other of fluorescent light source 16 and LEDs 46.

In gradually reducing or dimming the illumination brightness from $L_{maximum}$ to $L_{minimum}$, for example, the electric current supplied to fluorescent light source 16 throughout the illumination range $R_{fluro}$ is gradually reduced until the illumination emitted by fluorescent light source 16 is detected by the photosensor to be $L_{transition}$. To this point, i.e. throughout the range $R_{fluor}$, no operating power is applied to LEDs 46. The illumination level at $L_{transition}$ may, by way of illustrative example, be a brightness of about 3 ft-L which is sufficient to maintain the plasma in fluorescent light source 16 and suitably less than the about 5 ft-L maximum brightness of LEDs 46. As the light emitted by fluorescent light source 16 decreases to and reaches this predetermined $L_{transition}$ level the supply of power to fluorescent light source 16 is discontinued and, at the same time, power is supplied to the LEDs so that the LEDs immediately begin to emit light to replace the illumination no longer being provided by the now-unpowered fluorescent light source 16. Throughout this operation, feedback photosensor 42 monitors the illumination of FPD 10 and, through the controller 40, ensures that the illumination of FPD 10 is at the desired level. Thus, when fluorescent light source 16 is switched off at the $L_{transition}$ illumination level and LEDs 46 are switched on to provide a replacement source of lighting, controller 40 and feedback photosensor 42 control the application of operating power to LEDs 46 so that LEDs 46 emit the proper amount of light to precisely replace that lost when fluorescent light source 16 is deenergized. In theory, this means that the LEDs should be energized to immediately provide an illumination level of $L_{transition}$—i.e. the exact level of illumination no longer provided by the deenergized fluorescent light source 16. In practice, however, there is a small amount of persistence associated with deactivation of fluorescent light source 16, and since feedback photosensor 42 is constantly monitoring the amount of light being provided to FPD 10 it senses such persistence (step 118) and causes controller 40 to operatively lower the LED emission level to compensate for the additional persisting illumination from fluorescent light source 16 so that the total actual illumination of FPD 10 remains constant, or at least continues to gradually vary in an imperceptibly smooth manner, irrespective of the source or sources of that FPD illumination. As the persistence fades, feedback photosensor 42 senses the lessening of the overall illumination of FPD 10, and then inputs this information to controller 40, which increases the output from LEDs 46 so that the overall illumination of FPD 10 remains constant.

Thus, as the overall ambient light falls below the level $L_{transition}$, LEDs 46 illuminate FPD 10 (and with fluorescent light source 16 now no longer energized or operating), and controller 40 can then proceed to smoothly reduce the supply of electric current to LEDs 46 (step 112) and thereby smoothly continue to gradually reduce the FPD illumination to the eventual final target brightness of $L_{minimum}$.

The operation, although reversed from that described above, is otherwise the same when smoothly increasing the FPD illumination brightness from $L_{minimum}$ to $L_{maximum}$ through $L_{transition}$. The sole difference is that LEDs 46 must now compensate for the delay in start up of fluorescent light source 16. As is well known, fluorescent lights do not turn on immediately, there is a lag while the plasma in the fluorescent tube energizes. To maintain the smooth transition in the change in brightness of FPD 10, LEDs 46 must compensate for the "missing" amount of fluorescent light until fluorescent light source 16 is completely energized. Accordingly, feedback photosensor 42 senses the amount of actual illumination of FPD 10, and reports that to controller 40. Controller 40 then determines the amount of additional illumination which must be imparted to FPD 10 to compensate for the lag in full brightness from the fluorescent light source, and energizes LEDs 46 sufficiently to generate the amount of additional light needed to maintain the overall smooth transition between $R_{fluor}$ and $R_{LEDs}$.

As should also be apparent, the invention advantageously permits the smooth and continuous variation and adjustment of the FPD illumination level throughout any portion or portions of the overall range, and at any desired rate. It is thus contemplated and intended that the invention be employed to smoothly vary the FPD illumination throughout ranges within or smaller than that defined by the combination of $R_{fluor}$ and $R_{LEDs}$. The inventive system and method may accordingly be used to dynamically adjust the backlit FPD brightness level, in a smoothly gradual manner and at appropriate rates that render the adjustments substantially imperceptible to a pilot or other viewer, in response to any and all changes, whether sudden or gradual, in ambient lighting conditions, such for example as changes in overall cockpit lighting, or changes in the ambient brightness as an aircraft passes through and among cloud layers of varying density, or when shadows, reflections, glare or direct sunlight falls on FPD 10 or other surfaces within the cockpit. These changes in ambient lighting and the like may for example be sensed by one or more other photosensors, such as photosensor 38, used in a suitable control arrangement to determine the current appropriate lighting level for the FPD.

In those embodiments including a manual offset controller 44, the user may further adjust the illumination of FPD 10 to match a personal preference and override the automatic adjustment provided by controller 40 (step 120). If the application so provides, the sole means for adjustment may be manual, which would obviate the need for photosensors 36, 38, and would render controller 40 simply a conduit for the signal received from manual controller 44.

It will additionally be appreciated that the inventive system and method further advantageously provide a failsafe emergency FPD backup lighting arrangement that will, in the event of a failure of fluorescent light source 16, operatively provide by way of LEDs 46 an illumination of FPD 10 for at least those conditions—i.e. of low level ambient light—in which the need for backlighting of the FPD to facilitate ease of viewing of displayed images and data is most critical.

In another embodiment of the invention, tri-color LEDs—which can operatively emit light of one or more of the colors red, green and blue (or other colors or combinations of color as a matter of design choice)—may be employed in place of the white light emitting LEDs described hereinabove. The use of tri-color LEDs permits the color of the illumination provided by the inventive system and method in low ambient light conditions, such as at night, to be tailored or adjusted to further facilitate ease of viewing of FPD displayed images and data and to prevent interference (such as from so-called night blindness) with the pilot's ability to view other instruments and materials and activities within, for example, a darkened cockpit or flight deck of an aircraft. Thus, at desired low levels of FPD illumination in an aircraft cockpit the tri-color LEDs may be operated so that, by way of illustration, the light emitted from the LEDs is colored toward the red end of the visible light color spectrum. A further modified embodiment in which a combination of white and tri-color LEDs is provided for increased illumination flexibility and to permit the use of white light and of predeterminately colored light at different portions of the LEDs-operating range $R_{LEDs}$ is also within the intended scope and contemplation of the invention.

It will be appreciated that, although the invention is described in the context of a FPD 10 used in an airplane cockpit, the inventive method and apparatus may also have general or specific utility in other fields, so that the foregoing description is intended for purposes of illustration only and not intended as limitative of the intended field of use. For example, and again without limitation, the invention may be used in other types of vehicles, with FPDs used in computer terminals, or with or in FPDs used in the operation of machinery, hand-held computer games or any other environment in which a backlit FPD may be used under varying ambient light conditions.

While there have been shown and described and pointed out certain novel features of the present invention as applied to preferred embodiments thereof, it will be understood by those skilled in the art that various omissions and substitutions and changes in the methods and apparatus described and shown herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

What is claimed is:

1. A method of illuminating a display screen of a flat panel display so as to smoothly and dynamically vary a display screen illumination level between a predetermined maximum illumination level suitable for viewing of the display screen in ambient daylight conditions and a predetermined minimum illumination level suitable for viewing of the display screen in ambient night conditions, comprising the steps of:

monitoring a level of ambient light incident on the display screen to determine a desired display screen illumination level within a range defined between the predetermined maximum and minimum illumination levels;

monitoring the current display screen illumination level by sensing current display screen brightness and providing said monitored level to a display screen illumination level controller that is operable for illuminating the display screen at said determined desired display screen illumination level by:

varying a one-hundred-percent duty cycle fluorescent electrical control signal for operating a fluorescent lamp disposed for illuminating the display screen between a first fluorescent control signal level for illuminating the display screen at the predetermined maximum illumination level and a second fluorescent control signal level for illuminating the display screen at a predetermined transition illumination level less than the predetermined maximum illumination level but greater than the predetermined minimum illumination level and greater than a minimum fluorescent operating control signal level sufficient for maintaining continuous constant-brightness output from the fluorescent lamp at a one-hundred-percent duty cycle, so as to illuminate the display screen at the determined desired display screen illumination level when the determined desired display screen illumination level is between said predetermined maximum illumination level and said predetermined transition illumination level;

varying an LED electrical control signal for operating at least one light emitting diode disposed for illuminating the display screen between a first LED control signal level for illuminating the display screen at the predetermined transition illumination level and a second LED control signal level for illuminating the display screen at the predetermined minimum illumination level, so as to illuminate the display screen at the desired display screen illumination level when the determined desired display screen illumination level is between said predetermined transition illumination level and said predetermined minimum illumination level;

as the desired display screen illumination level decreases to said predetermined transition illumination level, discontinuing supply of the fluorescent control signal to the fluorescent lamp to discontinue illumination output from the fluorescent lamp, supplying the LED control signal to the at least one light emitting diode, and varying the LED control signal in accordance with the monitored current display screen illumination level to illuminate the display screen at the determined desired display screen illumination level; and as the desired display screen illumination level increases to said predetermined transition illumination level, initiating supply of the fluorescent control signal to the fluorescent lamp to initiate illumination output from the fluorescent lamp, varying the LED control signal in accordance with the monitored current display screen illumination level to assist the fluorescent tube in illuminating the display screen at the determined desired display screen illumination level as the fluorescent tube is initially powered, and discontinuing supply of the LED control signal to the at least one light emitting diode when the monitored current display screen illumination level indicates that the illumination output of the fluorescent tube is sufficient to illuminate the display screen to the determined desired display screen illumination level.

2. Apparatus for illuminating a display screen of a flat panel display so as to smoothly and dynamically vary a display screen illumination level between a predetermined maximum illumination level suitable for viewing of the display screen in ambient daylight conditions and a predetermined minimum illumination level suitable for viewing of the display screen in ambient night conditions, said apparatus comprising:

an ambient light sensor for monitoring a level of ambient light incident on the display screen to determine a desired display screen illumination level within a range defined between the predetermined maximum and minimum illumination levels;

a display illumination level sensor for monitoring the current display screen illumination level by sensing current display screen brightness;

a fluorescent lamp disposed for illuminating the display screen;

at least one light emitting diode disposed for illuminating the display screen;

a display screen illumination level controller connected to the ambient light sensor for determining from the monitored level of incident ambient light a desired display screen illumination level within a range defined between the predetermined maximum and minimum illumination levels, and to the display illumination level sensor for receiving the monitored current display screen illumination level, and connected to the fluorescent tube and to the at least one light emitting diode, said controller being operable for illuminating the display screen at the determined desired display screen illumination level by:

varying a one-hundred-percent duty cycle fluorescent electrical control signal for operating the fluorescent lamp between a first fluorescent control signal level for illuminating the display screen at the predetermined maximum illumination level and a second fluorescent control signal level for illuminating the display screen at a predetermined transition illumination level less than the predetermined maximum illumination level but greater than the predetermined minimum illumination level and greater than a minimum fluorescent operating control signal level sufficient for maintaining continuous constant-brightness output from the fluorescent lamp at a one-hundred-percent duty cycle, so as to illuminate the display screen at the determined desired display screen illumination level when the determined desired display screen illumination level is between said predetermined maximum illumination level and said predetermined transition illumination level;

varying an LED electrical control signal for operating the at least one light emitting diode between a first LED control signal level for illuminating the display screen at the predetermined transition illumination level and a second LED control signal level for illuminating the display screen at the predetermined minimum illumination level, so as to illuminate the display screen at the desired display screen illumination level when the determined desired display screen illumination level is between said predetermined transition illumination level and said predetermined minimum illumination level;

as the desired display screen illumination level decreases to said predetermined transition illumination level, discontinuing supply of the fluorescent control signal to the fluorescent lamp to discontinue illumination output from the fluorescent lamp, supplying the LED control signal to the at least one light emitting diode, and varying the LED control signal in accordance with the monitored current display screen illumination level to illuminate the display screen at the determined desired display screen illumination level; and as the desired display screen illumination level increases to said predetermined transition illumination level, initiating supply of the fluorescent control signal to the fluorescent lamp to initiate illumination output from the fluorescent lamp, varying the LED control signal in accordance with the monitored current display screen illumination level to assist the fluorescent tube in illuminating the display screen at the determined desired display screen illumination level as the fluorescent tube is initially powered, and discontinuing supply of the LED control signal to the at least one light emitting diode when the monitored current display screen illumination level indicates that the illumination output of the fluorescent tube is sufficient to illuminate the display screen to the determined desired display screen illumination level.

3. Apparatus for illuminating a display screen of a flat panel display so as to smoothly and dynamically vary a display screen illumination level between a predetermined maximum illumination level suitable for viewing of the display screen in ambient daylight conditions and a predetermined minimum illumination level suitable for viewing of the display screen in ambient night conditions, said apparatus comprising:

a display illumination level sensor for monitoring a current display screen illumination level by sensing current display screen brightness;

a fluorescent lamp disposed for operatively illuminating the display screen at display screen illumination levels in a first display screen illumination range defined between the predetermined maximum illumination level and a predetermined transition illumination level less than the predetermined maximum illumination level but greater than the predetermined minimum illumination level;

at least one light emitting diode disposed for operatively illuminating the display screen at display screen illumination levels in a second display screen illumination range defined between the predetermined transition illumination level and the predetermined minimum illumination level; and a display screen illumination level controller connected to the display illumination level sensor, to the fluorescent lamp and to the at least one light emitting diode and operable for controlling operation of the fluorescent lamp and the at least one light emitting diode to smoothly and dynamically vary the display screen illumination selectively between the predetermined maximum and minimum illumination levels so as to illuminate the display screen at a present desired display screen illumination level by:

varying a fluorescent electrical control signal for operating the fluorescent lamp between a first fluorescent control signal level for illuminating the display screen at the predetermined maximum illumination level and a second fluorescent control signal level for illuminating the display screen at the predetermined transition illumination level, so as to illuminate the display screen using said operating fluorescent lamp at a display screen illumination level within said first display screen illumination range;

discontinuing supply of the fluorescent electrical control signal to the fluorescent lamp when the present desired display screen illumination level is varied from said first display screen illumination range to said second display screen illumination range so as to shut-off the fluorescent lamp in said second display screen illumination range;

initiating supply of the fluorescent electrical control signal to the fluorescent lamp when the present desired display screen illumination level is varied from said second display screen illumination range to said first display screen illumination range so as to power-on the fluorescent lamp for predeterminately illuminating the display screen in said first display screen illumination range;

varying an LED electrical control signal for operating the at least one light emitting diode between a first LED control signal level for illuminating the display screen at the predetermined transition illumination level and a second LED control signal level for illuminating the display screen at the predetermined minimum illumination level, so as to illuminate the display screen using said at least one light emitting diode at a display screen illumination level within said second display screen illumination range; and further varying the LED electrical control signal for predeterminately illuminating the display screen at and proximate the predetermined transition illumination level to one of (i) decrease the LED electrical control signal in accordance with the monitored current display screen illumination level and the present desired display screen illumination level to correct for fluorescent lamp persistence at fluorescent lamp shut-off, and (ii) increase the LED electrical control signal in accordance with the monitored current display screen illumination level and the present desired display screen illumination level to correct for fluorescent lamp start-up delays and fluorescent lamp start-up illumination level variations when the fluorescent lamp is initially powered on, to thereby maintain an uninterruptedly smooth variation in the display screen illumination level as the display screen illumination level is dynamically varied between the predetermined maximum display screen illumination level and the predetermined minimum display screen illumination level.

4. A method of illuminating a display screen of a flat panel display so as to smoothly and dynamically vary a display screen illumination level between a predetermined maximum illumination level suitable for viewing of the display screen in ambient daylight conditions and a predetermined minimum illumination level suitable for viewing of the display screen in ambient night conditions, comprising the steps of:

monitoring a current display screen illumination level by sensing current display screen brightness;

providing a fluorescent lamp disposed for operatively illuminating the display screen at display screen illumination levels in a first display screen illumination range defined between the predetermined maximum illumination level and a predetermined transition illumination level less than the predetermined maximum illumination level but greater than the predetermined minimum illumination level;

providing at least one light emitting diode disposed for operatively illuminating the display screen at display screen illumination levels in a second display screen illumination range defined between the predetermined transition illumination level and the predetermined minimum illumination level; and controlling operation of the fluorescent lamp and the at least one light emitting diode to smoothly and dynamically vary the display screen illumination selectively between the predetermined maximum and minimum illumination levels so as to illuminate the display screen at a present desired display screen illumination level by:

varying a fluorescent electrical control signal for operating the fluorescent lamp between a first fluorescent control signal level for illuminating the display screen at the predetermined maximum illumination level and a second fluorescent control signal level for illuminating the display screen at the predetermined transition illumination level, so as to illuminate the display screen using the operating fluorescent lamp at a display screen illumination level within said first display screen illumination range;

discontinuing supply of the fluorescent electrical control signal to the fluorescent lamp when the present desired display screen illumination level is varied from said first display screen illumination range to said second display screen illumination range so as to shut-off the fluorescent lamp in said second display screen illumination range;

initiating supply of the fluorescent electrical control signal to the fluorescent lamp when the present desired display screen illumination level is varied from said second display screen illumination range to said first display screen illumination range so as to power-on the fluorescent lamp for predeterminately illuminating the display screen in said first display screen illumination range;

varying an LED electrical control signal for operating the at least one light emitting diode between a first LED control signal level for illuminating the display screen at the predetermined transition illumination level and a second LED control signal level for illuminating the display screen at the predetermined minimum illumination level, so as to illuminate the display screen using the at least one light emitting diode at a display screen illumination level within said second display screen illumination range; and further varying the LED electrical control signal for predeterminately illuminating the display screen at and proximate the predetermined transition illumination level to one of (i) decrease the LED electrical control signal in accordance with the monitored current display screen illumination level and the present desired display screen illumination level to correct for fluorescent lamp persistence at fluorescent lamp shut-off, and (ii) increase the LED electrical control signal in accordance with the monitored current display screen illumination level and the present desired display screen illumination level to correct for fluorescent lamp start-up delays and fluorescent lamp start-up illumination level variations when the fluorescent lamp is initially powered on, to thereby maintain an uninterruptedly smooth variation in the display screen illumination level as the display screen illumination level is dynamically varied between the predetermined maximum display screen illumination level and the predetermined minimum display screen illumination level.

5. A method in accordance with claim 1, wherein said step of monitoring the current display screen illumination level comprises optically monitoring the current display screen illumination level.

6. A method in accordance with claim 1, wherein said step of monitoring the current display screen illumination level comprises optically monitoring the current display screen illumination level using a photosensor.

7. An apparatus for illuminating a display screen in accordance with claim 2, wherein said display illumination level sensor comprises an optical illumination level sensor operable for optically monitoring the current display screen illumination level.

8. An apparatus for illuminating a display screen in accordance with claim 2, wherein said display illumination level sensor comprises a photosensor for optically monitoring the current display screen illumination level.

9. An apparatus for illuminating a display screen in accordance with claim 3, wherein said display illumination level sensor comprises an optical illumination level sensor operable for optically monitoring the current display screen illumination level.

10. An apparatus for illuminating a display screen in accordance with claim 3, wherein said display illumination level sensor comprises a photosensor for optically monitoring the current display screen illumination level.

11. A method in accordance with claim 4, wherein said step of monitoring the current display screen illumination level comprises optically monitoring the current display screen illumination level.

12. A method in accordance with claim 4, wherein said step of monitoring the current display screen illumination level comprises optically monitoring the current display screen illumination level using a photosensor.

* * * * *